United States Patent [19]

Mazurkewitz

[11] 4,391,495

[45] Jul. 5, 1983

[54] IMAGE DISPLAY SYSTEM

[75] Inventor: Anthony R. Mazurkewitz, Middlevillage, N.Y.

[73] Assignee: The Austin Company, Cleveland, Ohio

[21] Appl. No.: 269,622

[22] Filed: Jun. 2, 1981

[51] Int. Cl.³ .............................................. G02B 3/08
[52] U.S. Cl. ...................,..................... 350/452
[58] Field of Search ................................ 350/418, 452

[56] References Cited

U.S. PATENT DOCUMENTS 3,909,525 9/1975 Fagan ................................. 350/452
4,286,839 9/1981 Ilzig et al. ........................... 350/418

OTHER PUBLICATIONS

Cox, 8-78 Proceedings of Society of Photo-Optical Instrumentation Engineers, vol. 162, Application of Fresnel Lenses to Virtual Image Display.

*Primary Examiner*—John K. Corbin
*Assistant Examiner*—Paul M. Dzierzynski
*Attorney, Agent, or Firm*—Price, Heneveld, Huizenga & Cooper

[57] ABSTRACT

An optical system for a visual display comprises a cathode ray tube for projecting a visual image along a central axis and a first fresnel lens for receiving the visual image. The first fresnel lens is provided with fresnel grooves facing the cathode ray tube. Second and third fresnel lenses forming a liquid doublet first fresnel lens pair are disposed in front of the first fresnel lens for receiving the visual image projected therethrough. The first fresnel lens pair is provided with fresnel grooves facing each other. The liquid disposed therebetween is provided with predetermined indexes of refraction and dispersion for color correcting the optical system. Fourth and fifth fresnel lenses are provided forming a second fresnel lens pair disposed in front of the first fresnel lens pair for receiving the visual image projected therethrough. The second fresnel lens pair is provided with fresnel grooves facing each other.

10 Claims, 11 Drawing Figures

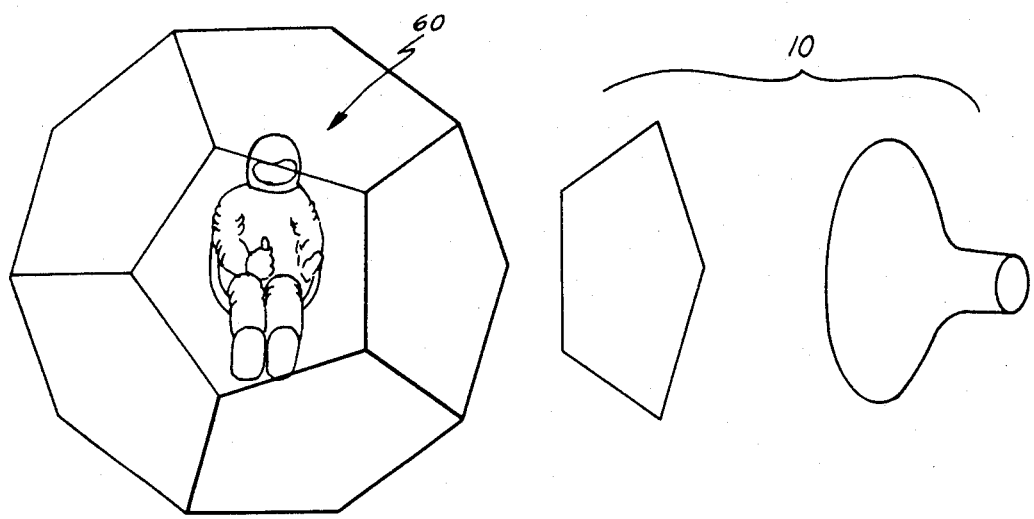
Fig. 9.
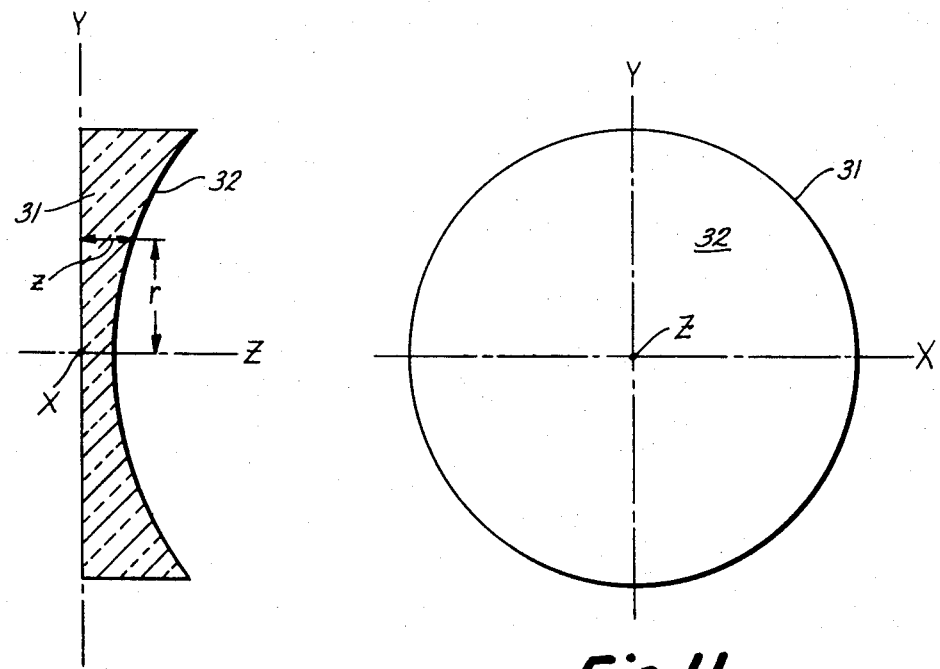
Fig. 10.
Fig. 11.

IMAGE DISPLAY SYSTEM

BACKGROUND OF THE INVENTION

The present invention relates generally to image forming instruments which present at or near infinity an image of a wide field of view. More particularly, the invention relates to an optical system for a visual vehicle simulator display having a large exit pupil for simultaneously accommodating both of the user's eyes and providing the user with a considerable degree of freedom for head movement before the visual corrected image is lost with one or the other of the user's eyes.

As the cost of training operators in sophisticated vehicles such as modern, commercial and military aircraft has risen, there has been an increased demand for better simulators and trainers in which training can be accomplished at a much lower cost. One requirement of many of these vehicle simulators or trainers is a visual projection system which can provide the trainee with visual cues.

In the past, image projection systems for these types of simulators have taken the form of a mirror and beam splitter for projecting the image generated by a cathode ray tube or the like. In one prior art arrangement, a cathode ray tube is disposed to the side of the central axis of the projection system with its screen extending in a direction generally parallel to the central axis of the projection system. The image from the cathode ray tube screen, located at the focus of a spherical mirror, is projected on to a tilted beam splitter which is centered on the central axis of the projection system. An image is reflected from the beam splitter to a spherical mirror which reflects the image along the central axis of the projection system back through the beam splitter toward the eye of the observer. The observer is positioned close to the center of curvature of the spherical mirror such that light which reaches the observer appears to be coming from infinity just as would occur in the real world. Such mirror beam splitter display systems are described in U.S. Pat. No. 3,432,219 and some of the references cited within. Also Pat. Nos. 3,659,920 and 3,709,581 disclose various forms of mirror beam splitter arrangements.

All prior art mirror beam splitter optical systems suffer from a common problem, namely, poor light transmission. In the case of the system previously described, only approximately twenty percent of the light generated by the cathode ray tube can be transmitted through the system. An additional problem with the optical system just described is that the side-mounted cathode ray tube and tilted beam splitter prevents the optical system from being positioned close to a vehicle on which training is being simulated. The side-mounted cathode ray tube and the tilted beam splitter also complicates the joining or abutting of several optical systems for achieving a contiguous field of view for training purposes. Abutting of optical projection systems in this manner is highly desirable when trying to design a simulator for a vehicle such as a military fighter which requires a wide field of view.

Attempts to alleviate the aforementioned problems relating to the side-mounted cathode ray tube and the tilted beam splitter have involved the use of a two way spherical mirror beam splitter. Such a system allows the screen of the cathode ray tube to be centered on the central axis of the projection system. The image generated by the cathode ray tube is then projected through the back of the spherical mirror and on to a beam splitter disposed directly in front of the spherical mirror in a perpendicular relationship to the central axis of the projection system. The image is then reflected from the beam splitter back to the spherical mirror which then reflects the image back through the beam splitter to the eyes of the observer which are disposed close to the center of curvature of the mirror. While this approach allows the screen of the cathode ray tube to be centered on the central axis of the projection system and facilitates the placement of projection systems in abutting relationship to create a large contiguous field of view, the transmissability of these types of systems is as low as one percent. As a result, cathode ray tubes having specially designed phosphor screens are necessary and it is necessary to drive the cathode ray tube very hard to create enough light for generating a usable training image. The cathode ray tubes used in these prior art systems are expensive and relatively unreliable. Furthermore, the amount of light transmitted through either types of prior art mirror beam splitter projection systems is so low so as to create an image which is of only marginal quality.

SUMMARY OF THE INVENTION

These and other problems in the prior art are solved by provision of an optical system for a visual display comprising means for projecting a visual image along a central axis and a plurality of fresnel lenses for presenting at or near infinity an image of a wide field object. The lenses are designed to provide a relatively large exit pupil such that both of the user's eyes may be used simultaneously and the user is left with considerable freedom for head movement before the corrected image is lost with one or the other of his eyes. The use of fresnel lenses facilitates placement of the means for projecting which may, for example, be a cathode ray tube, on the central axis of the projection system. This facilitates arrangement of the projection systems in abutting relationship to provide a large contiguous field of view for training purposes. Furthermore, the optical system of the present invention is lightweight and is provided with excellent correction for optical aberrations so as to portray the scene projected to infinity with a very high degree of realism and fidelity. Furthermore, the fresnel lenses facilitate the use of aspheric lenses. Aspheric lenses are difficult to reproduce with a conventional refractive lens. However, it is much easier to shape the individual grooves of a fresnel lens to simulate an aspheric lens. The image projected by the cathode ray tube is directed to a first fresnel lens having a plurality of fresnel grooves facing the cathode ray tube. Second and third fresnel lenses forming a liquid doublet first fresnel lens pair are disposed in front of the first fresnel lens for receiving the visual image projected therethrough from the cathode ray tube. The first fresnel lens pair is provided with fresnel grooves facing each other and a liquid disposed therebetween. The liquid is provided with predetermined indexes of refraction and dispersion for color correcting the system. Fourth and fifth fresnel lenses are provided for forming a second fresnel lens pair disposed in front of the first fresnel lens pair for receiving the visual image projected therethrough from the cathode ray tube. The second fresnel lens pair is provided with fresnel grooves facing each other. The first through fifth fresnel lenses are all approximately centered on the central axis of the optical system and arranged to extend roughly perpendicular thereto.

BRIEF DESCRIPTION OF THE DRAWINGS

FIG. 9 is a perspective view of a vehicle simulator of the type having a plurality of pentagonal shaped screens disposed in abutting relationship to create a dodecehedron-shaped display having a contiguous spherical field of view.

FIG. 10 is a sectional view of a conventional plano concave negative lens.

FIG. 11 is a front view of the lens illustrated in FIG. 10.

DESCRIPTION OF THE PREFERRED EMBODIMENTS

Figure 1:
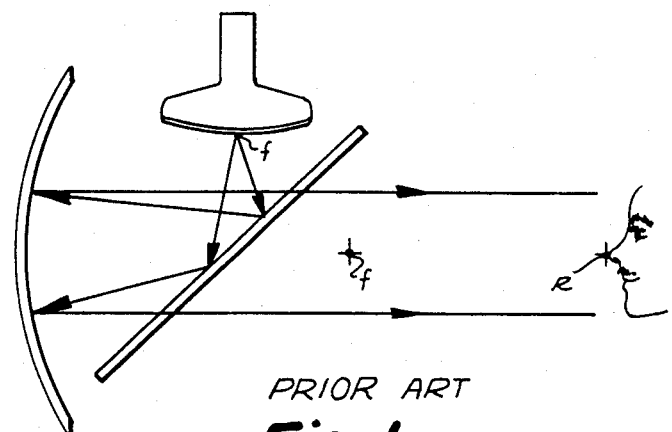
FIG. 1 is an illustration of a prior art visual display employing a tilted beam splitter spherical mirror projection system.
Figure 2:
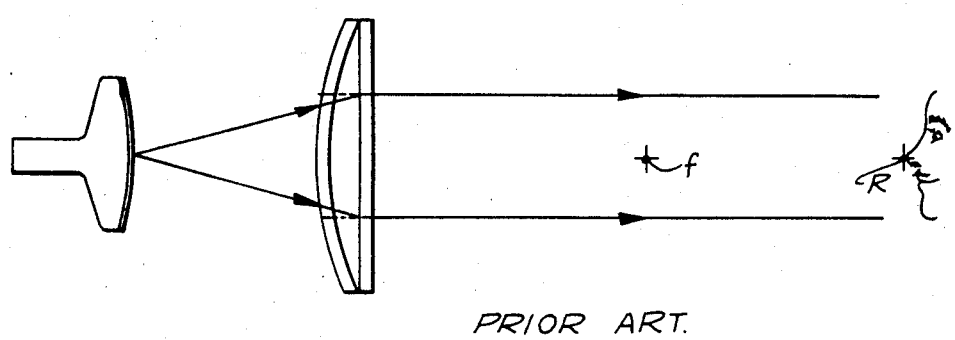
FIG. 2 is an illustration of a prior art visual display employing a transparent spherical mirror and perpendicular beam splitter arrangement.
Figure 4:
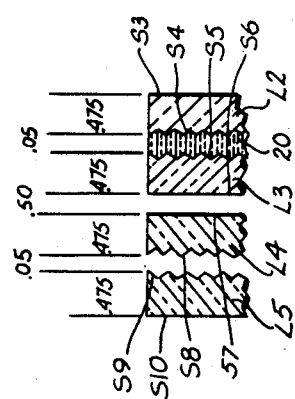
FIG. 4 is a partial sectional view of two fresnel lens pairs forming a portion of the optical system of the present invention.
Figure 3:
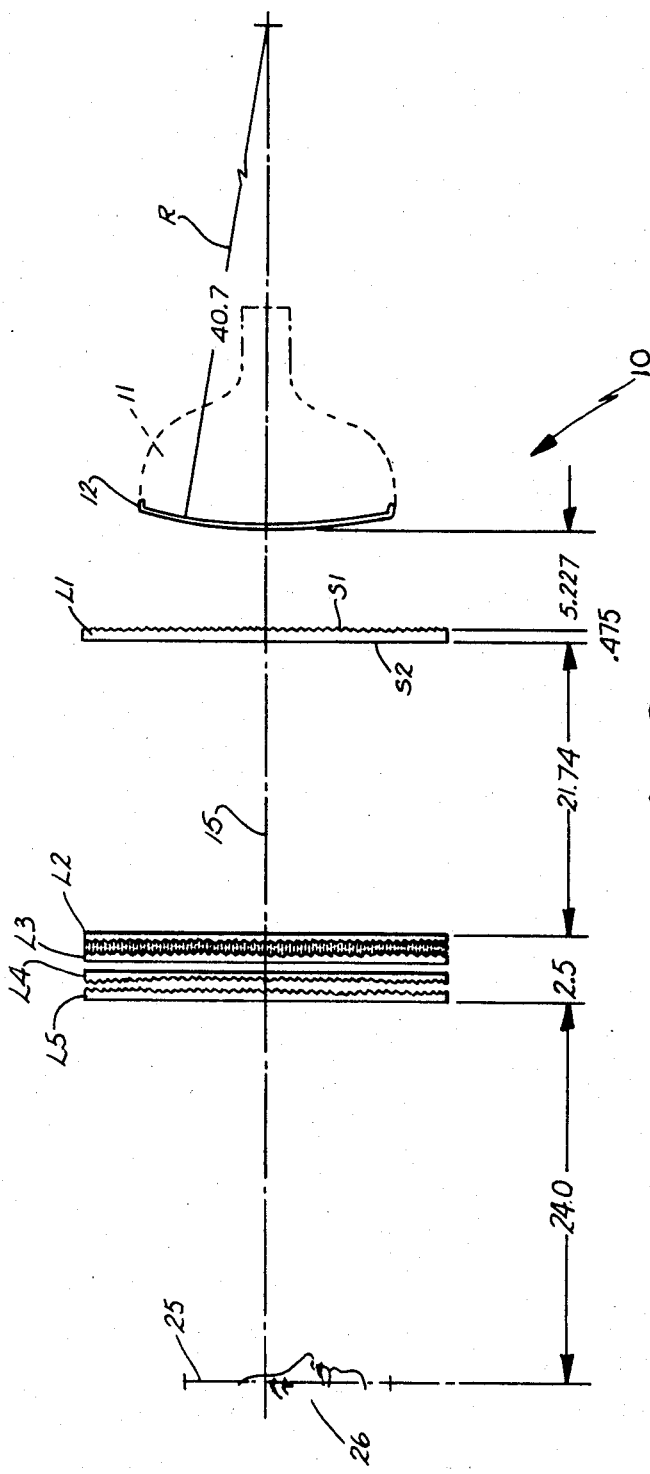
FIG. 3 is an elevational view of the optical system of the present invention.

With reference to FIG. 3, the optical system of the present invention is generally illustrated at 10. Means for projecting a visual image is provided which in this case comprises a cathode ray tube 11. In this case, the cathode ray tube 11 is provided with a screen 12 having a radius R of 40.7 inches. The cathode ray tube 11 is centered on the central axis 15 of the optical system for projecting a visual image along the central axis. A first fresnel lens L1 is disposed in front of the screen 12 of the cathode ray tube 11. The first fresnel lens L1 is provided with fresnel grooves facing the screen 12. Second and third fresnel lenses L2 and L3 form a liquid doublet first fresnel lens pair disposed in front of the first fresnel lens L1 for receiving the visual image projected therethrough from the cathode ray tube screen 12. With reference now also to FIG. 4, it is illustrated that the first fresnel lens pair L2 and L3 are provided with fresnel grooves which face each other. A liquid 20 is disposed therebetween. The liquid 20 is provided with predetermined indexes of refraction and dispersion for color correcting the optical system. Fourth and fifth fresnel lenses L4 and L5, respectively, are disposed in front of the first fresnel lens pair for receiving the visual image projected therethrough from the screen 12 of the cathode ray tube. The second fresnel lens pair L4 and L5 are provided with fresnel grooves which face one another. The lenses L1 through L5 cooperate to create an optical system having a 12 inch exit pupil 25 through which the observer at 26 views the image generated on the screen 12 of the cathode ray tube. The relatively large exit pupil 25 accommodates both of the user's eyes simultaneously and provides him with a considerable degree of freedom for head movement before the corrected image is lost with one or the other eye. If conventional refractive lenses were used to imitate the optical system of the present invention, the lenses would be unduly large and heavy. Furthermore, generation of aspheric lenses of the size required for this application would be difficult and expensive.

Figure 5:
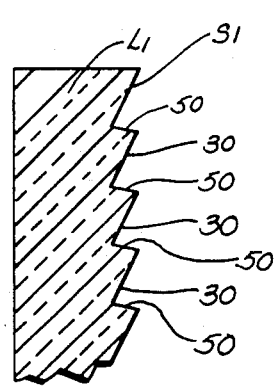
FIg. 5 is a partial sectional view of one of the fresnel lenses forming a part of the optical system of the present invention.
Figure 6:
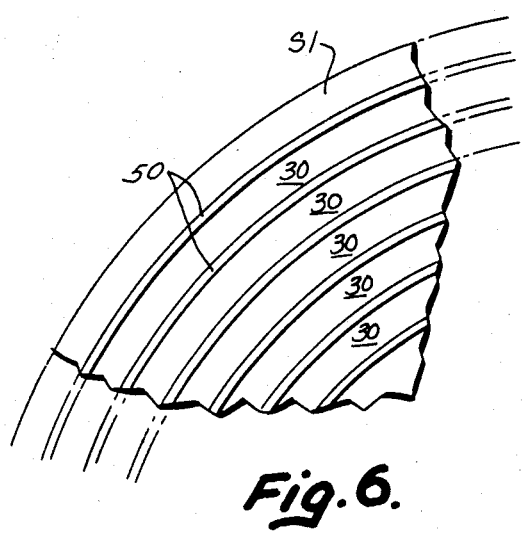
FIg. 6 is a partial plan view of one of the fresnel lenses forming a portion of the optical system of the present invention.

With reference now to FIGS. 5 and 6, a representative fresnel lens such as the lens L1 is illustrated. The fresnel lens L1 is provided with a first surface S1 which is covered with a plurality of annular facets or grooves 30. The prescription for each of the surfaces S1 through S11 is given in Table I. Assuming for the purpose of illustration only, that the lens L1 is intended to simulate the refractive lens 31 illustrated in FIGS. 10 and 11, the facets 30 are provided with slopes which simulate the slope of the surface 32 of refractive lens 31 at any given distance from the Z axis which is the central axis of the lens 31. However, the annular facets 30 are all concentrically arranged in a planar array centered on the central axis Z to provide a lens L1 of significantly less thickness and weight.

Figure 7:
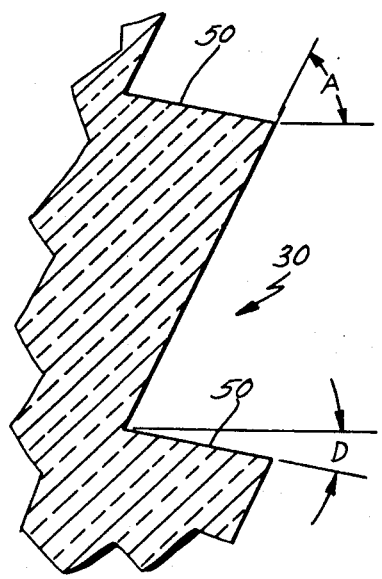
FIG. 7 is a partial sectional view of one facet of one of the fresnel lenses of the present invention.

With reference now also to FIG. 7, one of the facets 30 is illustrated in greater detail. In preferred embodiments of the invention the facets 30 are each provided with a slope determined by dz/dr where:

$$z = \frac{Cr^2}{(1 + \sqrt{1 - (K + 1)C^2 r^2})} + Dr^4 + Er^6 + Fr^8 + Gr^{10} \quad (1)$$

In equation 1, C equals the curvature of the lens, r equals the distance from the Z axis, K equals a conic constant which is related to the physical characteristics of the lens, that is to say, K varies depending upon whether the base curvature of the lens is spherical, hyperboloid, ellipsoid or paraboloid and the D, E, F, and G terms are aspheric terms which determine the aspheric characteristics of the lens. With reference to the refractive lens illustrated in FIGS. 10 and 11, z in Equation 1 represents the dimension or thickness of the lens 31 in the direction of the Z axis at any given distance r from the Z axis. Thus, dz/dr equals the slope of the surface 32 at any given point along the surface 32 of the lens 31. dz/dr thus is used to determine the slope A of the facets 30 of the fresnel lens L1.

Figure 8:
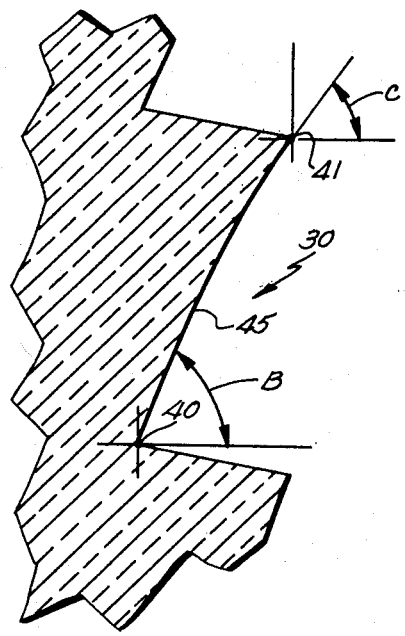
FIG. 8 is a partial sectional view of one facet of one of the lenses of the present invention.

With reference now to FIG. 8, it is illustrated that in preferred embodiments the fresnel grooves or facets 30 are provided with an inner end 40 and an outer end 41. In this embodiment of the invention, the slopes B and C of the facets at the inner and outer ends 40 and 41, respectively, are determined by dz/dr where Z is defined by Equation 1. Thereafter, the surface 45 of the groove or facet 30 is defined by a curvilinear surface interconnecting the inner and outer ends 40 and 41 of the facet 30 and coincident with the slopes B and C of the inner and outer ends, respectively.

With reference to Table I, a complete perscription for the lenses of the optical system of the present invention is given for an optical system having the dimensions illustrated in FIGS. 3 and 4.

TABLE 1

Focal length of whole system f = 24.184 inches

TABLE 1-continued

| | | BFL = 5.227 CRT faceplate radius = 40.7 | |
|---|---|---|---|
| LENS | | DIMENSIONS | GLASS CONSTANTS |
| L5 | S10 | $R_{10} = \infty$ | Index $\eta = 1.4917$ |
| | | $t_6 = .475$ | |
| | S9 | $R_9 = -18.357$ | Abbe number $\nu = 57.17$ |
| | | $d_3 = .05$ | |
| L4 | S8 | $R_8 = 33.846$ | Index $\eta = 1.4917$ |
| | | $t_5 = .475$ | |
| | S7 | $R_7 = \infty$ | Abbe number $\nu = 57.17$ |
| | | $d_2 = .500$ | |
| L3 | S6 | $R_6 = \infty$ | Index $\eta = 1.4917$ |
| | | $t_4 = .475$ | |
| | S5 | $R_5 = -9.329$ | Abbe number $\nu = 57.17$ |
| Liquid | | $t_3 = .05$ | $\eta = 1.53326 \quad \nu = 32.96$ |
| L2 | S4 | $R_4 = 9.329$ | $\eta = 1.4917$ |
| | | $t_2 = .475$ | |
| | S3 | $R_3 = \infty$ | $\nu = 57.17$ |
| | | $d_1 = 21.74$ | |
| L1 | S2 | $R_2 = \infty$ | $\eta = 1.4917$ |
| | | $t_1 = .475$ | |
| | S1 | $R_1 = -12.458$ | $\nu = 57.17$ |

K and Aspheric Data

| Surface | K | D | E | F | G |
|---|---|---|---|---|---|
| S2 | $-3.73824$ | $2.68754 \times 10^{-5}$ | $-4.11411 \times 10^{-8}$ | $-6.26786 \times 10^{-11}$ | $2.10145 \times 10^{-13}$ |
| S4 | $-5.34900$ | $6.47811 \times 10^{-6}$ | $-1.50598 \times 10^{-7}$ | $4.37691 \times 10^{-10}$ | $-5.04655 \times 10^{-13}$ |
| S5 | $-5.34900$ | $-6.47817 \times 10^{-6}$ | $1.50598 \times 10^{-7}$ | $-4.37691 \times 10^{-10}$ | $5.04655 \times 10^{-13}$ |
| S8 | $-5.96947 \times 10^1$ | $-3.42665 \times 10^{-5}$ | $5.27737 \times 10^{-8}$ | $-1.23096 \times 10^{-10}$ | $2.00458 \times 10^{-13}$ |
| S9 | $-2.08977$ | $+1.87050 \times 10^{-5}$ | $-1.02040 \times 10^{-7}$ | $1.49312 \times 10^{-10}$ | $4.59825 \times 10^{-14}$ |

With reference now to FIGS. 5, 6 and 7 it is illustrated that the fresnel grooves or facets 30 are interconnected by a plurality of annular draft surfaces 50. In preferred embodiments of the invention, the annular draft surfaces of each of the lenses L1 through L5 are provided with a slope D, best illustrated in FIG. 7, which is coincident with a pencil of light traveling through the system to the exit pupil 25. Thus, the observer is always viewing the annular draft surfaces on edge and occultation of the light as a result of the annular draft surfaces is reduced to a minimum.

With reference now to FIG. 9, it is illustrated that a plurality of the optical systems 10 of the present invention may be disposed in an abutting relationship to provide a large contiguous field of view. More specifically, in this case, a military aircraft simulator or trainer is depicted wherein the pilot sits at 60 with access to the controls of the simulator. In this case, the fresnel elements of the optical system are provided with a pentagonal shape and are disposed in abutting relationships to provide a visual display for the operator 60 having a dodecahedron shape. Dodecahedrons are twelve-side geodesic figures made up of pentagonal surfaces. Such a dodechaedron visual display would require twelve of the optical display systems of the present invention. The twelve abutting optical display systems would provide the operator 60 with a contiguous spherical field of view or a field of view that extends in 360° in all directions. While other geodesic structures may be used to form a spherical field of view, the dodecehedron presents a reasonable compromise between the resolution achieved and the number of independent optical display systems required to form the contiguous field of view. Such a simulator is useful in accurately simulating the visual cues encountered by a pilot when flying a highly maneuverable military aircraft. Of course, other more simple displays may be constructed, using fewer surfaces for the purpose of simulating visual cues encountered by the operators of equipment or vehicles having a smaller range of field of view.

The above description should be considered as exemplary and that of the preferred embodiment only. The true spirit and scope of the present invention should be determined by reference to the appended claims. It is desired to include within the appended claims all modifications of the invention that come within the proper scope of the invention.

The embodiments of the invention in which an exclusive property or privilege is claimed are defined as follows:

1. An optical system for a visual display comprising:
   means for projecting a visual image along a central axis;
   a first fresnel lens for receiving said visual image, said first fresnel lens having fresnel grooves facing said means for projecting;
   second and third fresnel lenses forming a liquid doublet first fresnel lens pair disposed in front of said first fresnel lens, said first fresnel lens pair having fresnel grooves facing each other and a liquid disposed therebetween, said liquid having predetermined indexes of refraction and dispersion for color correcting the system;
   fourth and fifth fresnel lenses forming a second fresnel lens pair disposed in front of said first fresnel lens pair, said second fresnel lens pair having fresnel grooves facing each other;
   said first, second, third, fourth and fifth fresnel lens being centered on said central axis and extending perpendicular thereto;
   said fresnel grooves being comprised of annular facets having a slope determined by dz/dr where:

$$z = \frac{Cr^2}{1 + \sqrt{1 - (K+1)C^2r^2}} + Dr^4 + Er^6 + Fr^8 + Gr^{10}$$

and C equals the curvature of said annular facets; r equals the radical position of said facets; K equals a conic constant determined by the physical characteristics of said lenses; and D, E, F and G are aspheric terms which determine the aspheric characteristics of said lenses.

2. The optical system of claim 1 wherein said fresnel grooves are comprised of annular facets having an inner and an outer end, the slope of said facets at said inner and outer ends being determined by dz/dr and the slope of the remaining portion of said facets being determined by a smooth curvilinear surface intersecting said inner and outer ends and having slopes at said inner and outer ends coincident with the slopes determined by dz/dr.

3. The optical system of claim 1 wherein said fresnel grooves are comprised of annular facets interconnected by a plurality of annular draft surfaces, said annular draft surfaces being provided with a slope coincident with a pencil of light traveling through the system to the eye of a user.

4. The optical system of claim 1 wherein a plurality of said optical systems are disposed in an abutting relationship to provide a large contiguous field of view.

5. The optical system of claim wherein said second fresnel lens pairs are provided with a pentagonal shape and twelve of said optical systems are disposed in abutting relationships to provide a dodecahendron visual display with a 360° field of view in all directions.

6. An optical system for a visual display comprising:
means for projecting a visual image along a central axis;
a first fresnel lens for receiving said visual image, said first fresnel lens having fresnel grooves facing said means for projecting;
second and third fresnel lenses forming a liquid doublet first fresnel lens pair disposed in front of said first fresnel lens, said first fresnel lens pair having fresnel grooves facing each other and a liquid disposed therebetween, said liquid having predetermined indexes of refraction and dispersion for color correcting the system;
fourth and fifth fresnel lenses forming a second fresnel lens pair disposed in front of said first fresnel lens pair, said second fresnel lens pair having fresnel grooves facing each other;
said first, second, third, fourth and fifth fresnel lens being centered on said central axis and extending perpendicular thereto; and said second fresnel lens pairs are provided with a pentagonal shape and twelve of said optical systems are disposed in abutting relationships to provide a dodecahedron visual display with a 360° field of view in all directions.

7. The optical system of claim 6 wherein said fresnel grooves are comprised of annular facets having a slope determined by dz/dr where:

$$z = \frac{Cr^2}{1 + \sqrt{1 - (K+1)C^2r^2}} Dr^4 + Er^6 + Fr^8 + Gr^{10}$$

and C equals the curvature of said annular facets; r equals the radial position of said facets; K equals a conic constant determined by the physical characteristics of said lenses; and D, E, F and G are aspheric terms which determine the aspheric characteristics of said lenses.

8. The optical system of claim 7 wherein said fresnel grooves are comprised of annular facets having an inner and an outer end, the slope of said facets at said inner and outer ends being determined by dz/dr and the slope of the remaining portion of said facets being determined by a smooth curvilinear surface intersecting said inner and outer ends and having slopes at said inner and outer ends coincident with the slopes determined by dz/dr.

9. The optical system of claim 6 wherein said fresnel grooves are comprised of annular facets interconnected by a plurality of annular draft surfaces, said annular draft surfaces being provided with a slope coincident with a pencil of light traveling through the system to the eye of a user.

10. The optical system of claim 6 wherein a plurality of said optical systems are disposed in an abutting relationship to provide a large contiguous field of view.

* * * * *